United States Patent Office 3,092,645
Patented June 4, 1963

3,092,645
ESTERS OF 17α-ALKYNYLESTER-5(10)-ENE-3β,17β-DIOLS
Robert T. Nicholson, Glenview, Ill., assignor to G. D. Searle & Co., Chicago, Ill., a corporation of Delaware
No Drawing. Filed Dec. 28, 1961, Ser. No. 162,917
3 Claims. (Cl. 260—397.5)

The present invention is concerned with diesters of steroidal diols and, more particularly, with esters of 17α-alkynylestr-5(10)-ene-3β,17β-diols, which can be represented by the structural formula

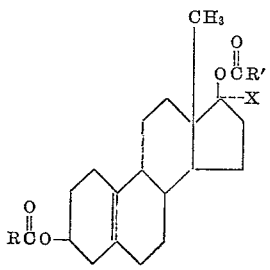

wherein R and R' are lower alkyl radicals and X is a lower alkynyl radical.

The lower alkyl radicals encompassed by the R and R' terms are, typically, methyl, ethyl, propyl, butyl, pentyl, hexyl, and the branched-chain isomers thereof. Examples of lower alkynyl radicals are ethynyl, propynyl, butynyl, pentynyl, hexynyl, and the branched-chain radicals isomeric therewith.

Starting materials suitable for the manufacture of the compounds of this invention are the 17α-alkynylestr-5(10)-ene-3β,17β-diols of the structural formula

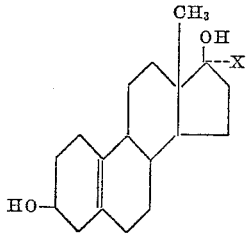

wherein X is a lower alkynyl radical. These materials can be obtained by reaction of the corresponding 17α-alkynyl-17β-hydroxyestr-5(10)-en-3-ones with a suitable reducing agent. A preferred reagent is lithium tri-(tertiary-butoxy) aluminum hydride, although other reducing agents such as sodium borohydride, potassium borohydride, and lithium aluminum hydride can also be used. This process is typified by the reaction of 17α-ethynyl-17β-hydroxyester-5(10)-en-3-one in tetrahydrofuran with lithium tri-(tertiary-butoxy) aluminum hydride to afford 17α-ethynylestr-5(10)-ene-3β,17β-diol.

Reaction of the latter diols with a suitable acylating agent affords the diesters of this invention. Typically, the aforementioned 17α-ethynylestr-5(10)-ene-3β,17β-diol is treated, for example, with acetic anhydride and pyridine at the reflux temperature to produce 17α-ethynyl-estr-5(10)-ene-3β,17β-diol 3,17-diacetate.

The compounds of this invention exhibit valuable pharmacological properties. They are, for example, estrogenic agents which lack the progestational proliferating side-effect on the endometrial gland.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centrigrade (° C.). Quantities of materials are expressed in parts by weight unless otherwise noted.

Example 1

To a solution of 130.9 parts of lithium tri(tertiary-butoxy) aluminum hydride in 314 parts of tetrahydrofuran is added dropwise, at 0–5°, in a nitrogen atmosphere, a solution of 35 parts of 17α-ethynyl-17β-hydroxy-estr-5(10)-en-3-one in 373 parts of tetrahydrofuran. This mixture is stirred at room temperature for about 3½ hours, then is cooled to 0–5° and acidified to pH 2–4 by the addition of 10% sulfuric acid. The supernatant liquid phase is decanted from the precipitated salts, then is diluted with water. The crystalline product which forms is collected by filtration and dried to yield 17α-ethynylestr-5(10)-ene-3β,17β-diol, M.P. about 135–141°. Recrystallization from methanol affords a pure sample melting at about 137–139°.

Example 2

A mixture of 10 parts of 17α-ethynylestr-5(10)-ene-3β,17β-diol, 54 parts of acetic anhydride, and 98 parts of pyridine is heated at reflux, under nitrogen, for about 2½ hours, then is cooled, diluted with ice and water, and extracted with ethyl acetate. The organic extract is washed with water, dried over anhydrous sodium sulfate, and concentrated to dryness in vacuo. The partially crystalline residue is recrystallized from methanol to produce 17α-ethynylestr-5(10)-ene-3β,17β-diol 3,17-diacetate, M.P. about 127–129°; [α]_D = +87° (chloroform). This compound exhibits characteristic infrared maxima at about 3.03, 5.72, and 8.00–8.12 microns.

Example 3

A mixture of one part of 17α-ethynylestr-5(10)-ene-3β,17β-diol, 5 parts of propionic anhydride, and 9.8 parts of pyridine is heated at reflux, under nitrogen, for about 2½ hours. This reaction mixture is then cooled, diluted with ice and water, and extracted with ethyl acetate. The organic extract is washed with water, dried over anhydrous sodium sulfate, and concentrated to dryness at reduced pressure to afford pure 17α-ethynylestr-5(10)-ene-3β,17β-diol 3,17-dipropionate, obtained as an oil. It is characterized by infrared maxima at about 3.00, 5.75, and 8.12–8.30 microns.

What is claimed is:
1. A compound of the formula

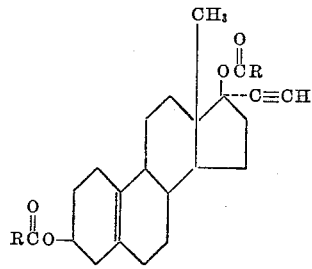

wherein R is a lower alkyl radical.

2. 17α - ethynylestr-5(10)-ene-3β,17β-diol 3,17-diacetate.

3. 17α - ethynylestr - 5(10)-ene-3β,17β-diol 3,17-dipropionate.

No references cited.